United States Patent
Kusanagi

(10) Patent No.: US 7,025,386 B2
(45) Date of Patent: Apr. 11, 2006

(54) COMMON RAIL

(75) Inventor: Ryuichi Kusanagi, Numazu (JP)

(73) Assignee: Usui Kokusai Sangyo Kaisha Limited, (JP)

( * ) Notice: Subject to any disclaimer, the term of this patent is extended or adjusted under 35 U.S.C. 154(b) by 16 days.

(21) Appl. No.: 10/723,852

(22) Filed: Nov. 25, 2003

(65) Prior Publication Data

US 2005/0110271 A1    May 26, 2005

(51) Int. Cl.
*F16L 39/00* (2006.01)

(52) U.S. Cl. .............................. 285/125.1; 285/129.1; 285/901

(58) Field of Classification Search ............. 285/125.1, 285/126.1, 129.1, 901, 416, 124.3, 124.5, 285/124.4
See application file for complete search history.

(56) References Cited

U.S. PATENT DOCUMENTS

| | | | |
|---|---|---|---|
| 1,109,768 A * | 9/1914 | Laux ..................... 285/125.1 |
| 2,518,292 A * | 8/1950 | De Anglis Mario ..... 285/125.1 |
| 2,548,788 A * | 4/1951 | Helme ................... 285/125.1 |
| 3,735,928 A * | 5/1973 | Watts et al. ............. 285/901 |
| 3,964,520 A * | 6/1976 | Baas ....................... 285/901 |
| 4,832,376 A | 5/1989 | Sugao |
| 4,893,601 A | 1/1990 | Sugao |
| 4,900,180 A | 2/1990 | Takikawa |
| 5,090,740 A * | 2/1992 | Creager et al. .......... 285/125.1 |
| 5,120,084 A | 6/1992 | Hashimoto |
| 5,143,410 A | 9/1992 | Takikawa |
| 5,169,182 A | 12/1992 | Hashimoto |
| 5,172,939 A | 12/1992 | Hashimoto |
| 5,320,238 A * | 6/1994 | Verdesca et al. ......... 285/126.1 |
| 5,667,255 A | 9/1997 | Kato |
| 5,887,910 A | 3/1999 | Usui |
| 5,903,964 A | 5/1999 | Uematsu et al. |
| 5,957,507 A | 9/1999 | Asada |
| 5,979,945 A | 11/1999 | Hitachi et al. |
| 5,992,904 A | 11/1999 | Hitachi et al. |
| 6,050,611 A | 4/2000 | Asada |
| 6,070,618 A | 6/2000 | Iwabuchi |
| 6,126,208 A | 10/2000 | Asada et al. |
| 6,397,881 B1 | 6/2002 | Asada et al. |
| 6,408,826 B1 | 6/2002 | Asada et al. |
| 6,415,768 B1 | 7/2002 | Usui |
| 6,463,909 B1 | 10/2002 | Asada et al. |
| 6,494,183 B1 | 12/2002 | Usui et al. |
| 2002/0140231 A1* | 10/2002 | Poole ..................... 285/368 |

FOREIGN PATENT DOCUMENTS

| JP | 2-80289 | 3/1990 |
| JP | 3-177693 | 8/1991 |
| JP | 4-175462 | 6/1992 |
| JP | 11241798 | * 7/1999 |

* cited by examiner

*Primary Examiner*—David Bochna
(74) *Attorney, Agent, or Firm*—Gerald E. Hespos; Anthony J. Casella

(57) ABSTRACT

A short common rail requiring less expensive manufacturing cost is provided. The common rail includes a short body portion formed of a thick tube body, a cap bonded to openings on both ends of the body portion, a securing flange bonded to one end of the body portion, a branch connector formed of a branch pipe or a branch joint fitting inserted into a through hole formed on the body portion and bonded thereto. The respective components are assembled and bonded by means of brazing or diffusion bonding.

5 Claims, 3 Drawing Sheets

PRIOR ART

COMMON RAIL

BACKGROUND OF THE INVENTION

1. Field of the Invention

The present invention relates generally to a common rail in an accumulator fuel injection system of a diesel internal combustion engine or a gasoline internal combustion engine.

2. Description of the Related Art

The common rail of this type is constructed of an elongated cylindrical main pipe rails having a flow path for storing pressurized fuel therein in many cases. However, as shown in FIG. 3 and FIG. 4, there is also a common rail constructed of a short cylindrical main pipe. The common rail of this type includes a main pipe rail 10 constructed of a short cylindrical body having a ceiling wall 11 of substantially flat shape or spherical shape (not shown) and boss portions 12 at a plurality of locations on a side wall, and a bottom wall 13 screwed into the main pipe rail 10. The common rail of this type is formed with a flow path 14 shaped like a flat space within the cylindrical body 10, a branch hole 15 formed in each of the boss portions 12, the branch hole 15 communicating with the flow path 14 of the main pipe rail 10 and having a pressure receiving bearing surface 16 opening outward, a male thread 12-1 formed on the outer periphery of each of the boss portions so that a supply pipe or an injection pipe (not shown) can be screwed thereon, and securing bracket 17 formed integrally with the main pipe rail 10 on the side of the bottom wall 13 at the other end.

However, since the common rail in the related art shown in FIG. 3 and FIG. 4 is manufactured as a product by fabricating a specific material by die forging and then machining a flow path, a branch joint, and a bracket, it has following disadvantages.

Since the specific material is formed by integral molding by die forging, a mold of high strength and high price is required. Since such specific material has to be finished by machining, long processing time is required. Since the material has to be heated up to a high temperature for improving moldability, energy for heating is required. Since tough oxide scale is generated due to hot processing, post processing, such as shot blast or acid cleaning, is required. In addition, high manufacturing cost is required.

SUMMARY OF THE INVENTION

In view of such circumstances, it is an object of the present invention to provide a high-quality common rail requiring low manufacturing cost by employing a method in which the entire common rail is constructed of separate components and assembled by joining the same into a single unit, instead of forming the same by a integral molding method using die forging.

A common rail according to the present invention includes a short body portion formed of a thick tube body, a cap fitted in and bonded to openings on both ends of the body portion preferably in a caulked state, a securing flange bonded to the body portion in a state of being fitted on one end thereof, and a branch connector being composed of a branch pipe or a branch joint fitting fitted into and bonded to a through hole formed on the body portion. The distal end of the short body portion formed of the thick tube body may be squeezed to reduce the diameter.

A precut thick steel pipe may be used as the body portion of the present invention and less expensive parts such as a pressed product formed of a steel plate may be used for the cap and the securing flange.

Joining means for assembling the components into a single unit by joining the same with respect to each other according to the present invention includes brazing and diffusion bonding. In brazing, various brazing materials such as copper, silver, nickel, or alloy brazing material formed of the combination thereof may be used as base material. In order to ensure corrosion resistance and durability, the entire common rail may be plated or coated with zinc or the like after joint.

In the present invention, the reason why the one end of the short body portion formed of the thick tube body is squeezed to reduce the diameter is to reduce a stress resulted from the internal pressure generated at the joint portion by reducing the area of the cap.

BEST MODE FOR CARRYING OUT THE INVENTION

Figure 1:
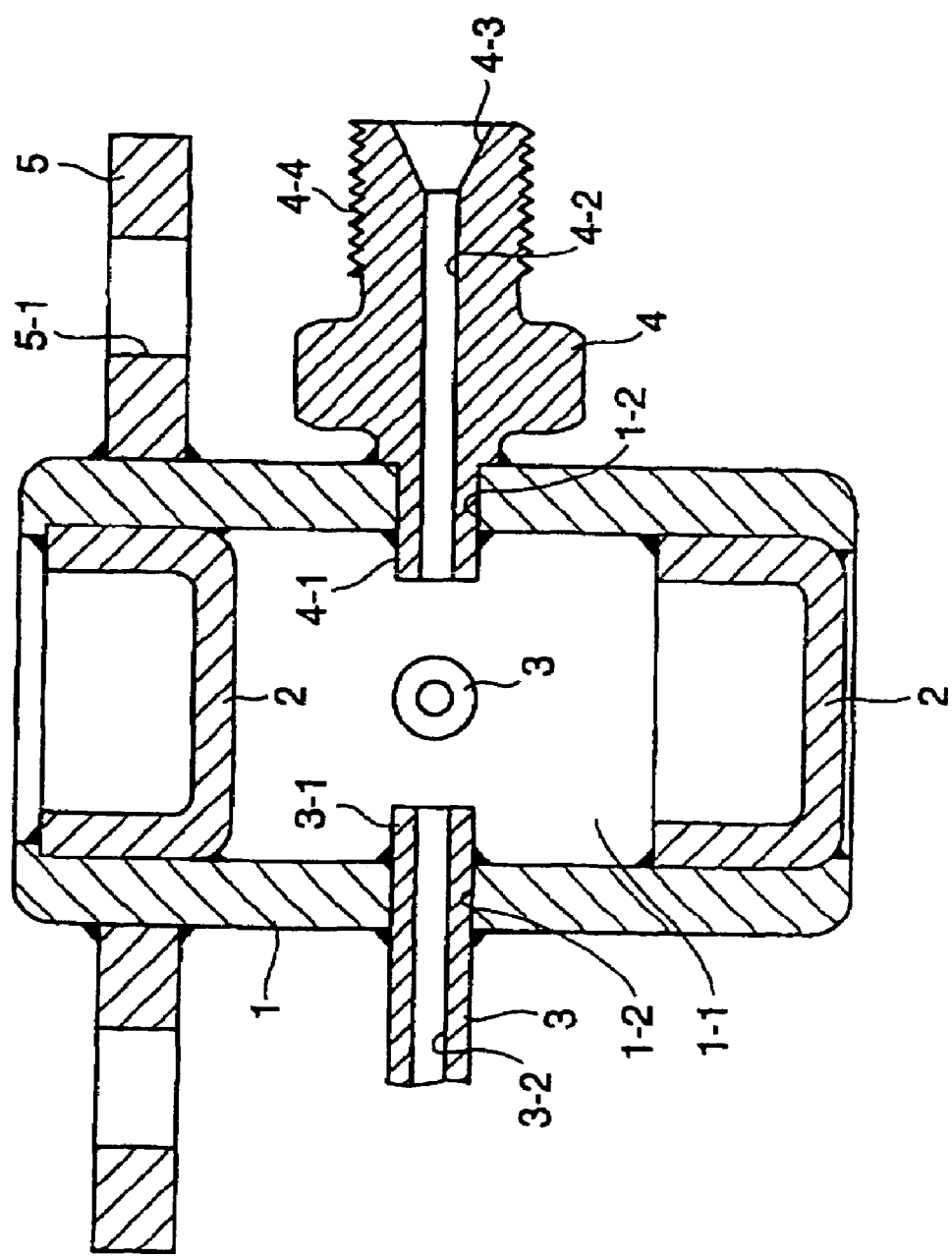
FIG. 1 is a vertical cross-sectional view showing a common rail according to an embodiment of the present invention.

In FIG. 1 to FIG. 4, reference numeral 1 designates a body portion, reference numerals 2 and 2S designate caps, reference numeral 3 designates a branch pipe, reference numeral 4 designates a branch joint fitting (nipple), and reference numeral 5 designates a securing flange.

The body portion 1, which corresponds to a main body of the common rail, defines a flow path 1-1 therein, and is formed of a carbon steel pipe for pressure piping of about φ8 mm or larger in inner diameter, or a thick steel pipe (in the order of 3 to 15 mm in thickness), such as a stainless steel pipe. The body portion 1 includes a plurality of through holes 1-2 at intervals on a peripheral wall extending circumferentially so as to communicate with the flow path 1-1. The through holes 1-2 are disposed on the identical circumference, or shifted in the axial direction (not shown).

The caps 2 each have such outer diameter that they can be fitted into both opening ends of the flow path 1-1 of the body portion 1. The cap 2 is joined to the body portion 1 by bonding the portion being in contact with the body portion 1 thereto after having been fitted into the opening end by caulking or by a rolling process.

The branch pipe 3 and the branch joint fitting 4 are to be connected by bonding to the body portion 1 in a state in which connecting ends 3-1 and 4-1 are fitted into the through holes 1-2 without changing the tube diameter. In this case, the respective connecting ends 3-1 and 4-1 of the branch pipe 3 and the branch joint fitting 4 are bonded to the through holes 1-2 in a state in which the respective connecting ends 3-1 and 4-1 are projected from the inner peripheral wall surface of the body portion 1 into the interior of the flow path 1-1.

The securing flange 5 has such an inner diameter that it can be fitted on the body portion 1, and is bonded to the body portion 1 in a state of being fitted on the proximal end of the body portion 1. Reference numeral 5-1 designates a mounting bolt hole.

Figure 2:
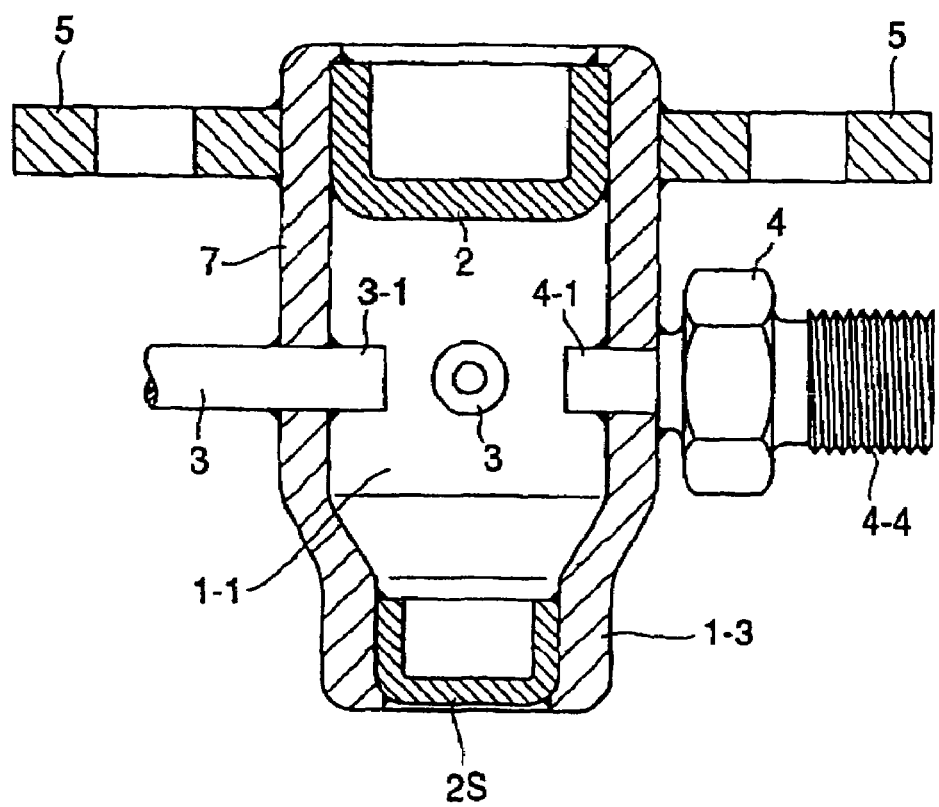
FIG. 2 is a vertical cross-sectional view showing a common rail according to another embodiment of the invention.
Figure 3:
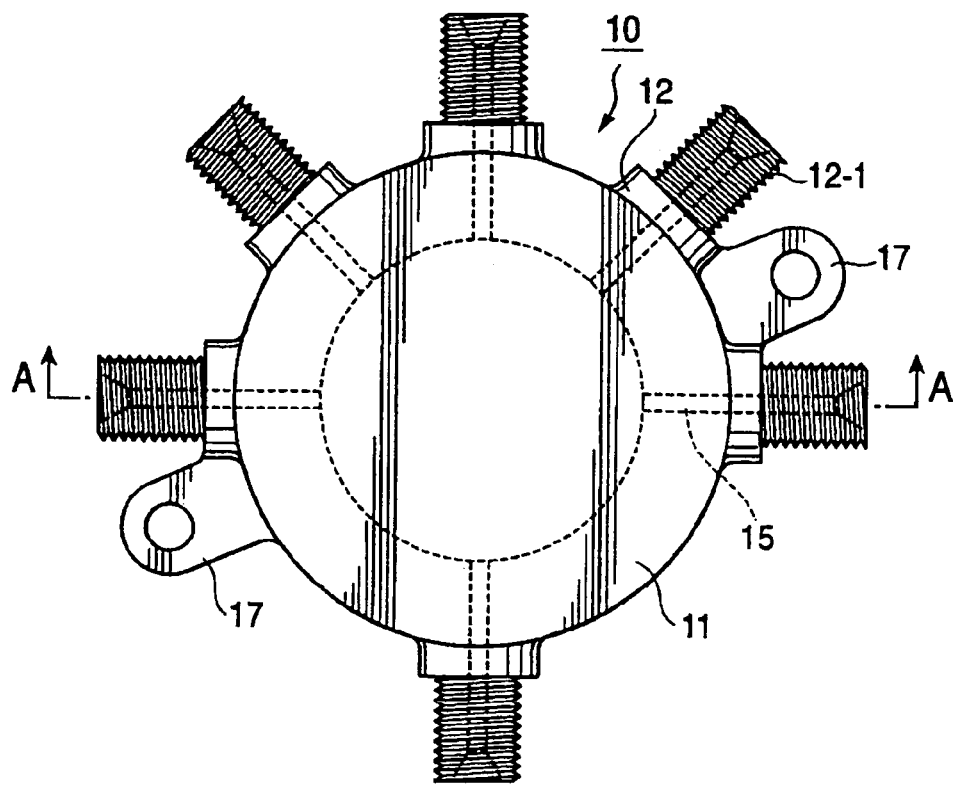
FIG. 3 is a plan view of an example of a common rail in the related art.
Figure 4:
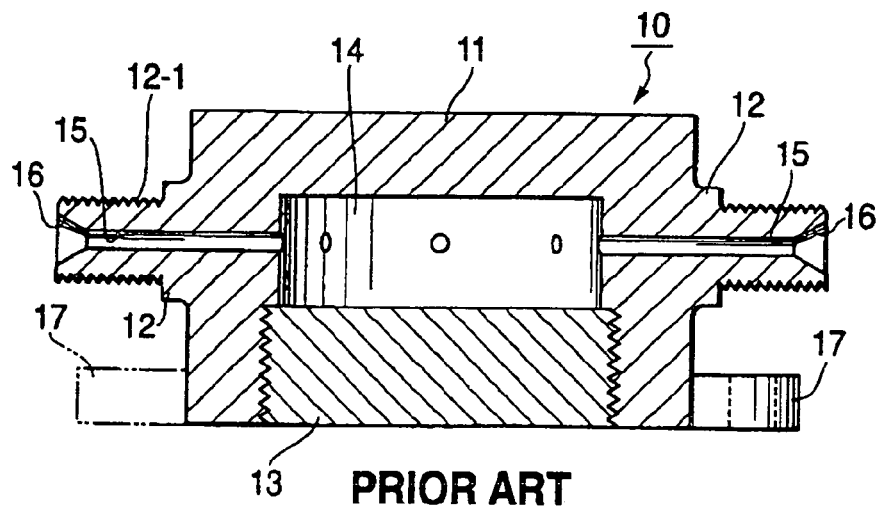
FIG. 4 is a vertical cross-sectional view taken along a line A—A in FIG. 3.

The common rail shown in FIG. 2 is formed with a reduced diameter portion 1-3 by squeezing the one end of the body portion, and the cap 2S of a small diameter is bonded to the reduced diameter portion 1-3.

The caps 2 and 2S, the securing flange 5, the branch pipe 3 and the branch joint fitting 4 as branch connectors may be formed of the same steel material as the body portion 1 or of various steel materials.

Reference numerals 3-2 and 4-2 designate flow paths, reference numeral 4-3 designates a pressure receiving bearing surface, and reference numeral 4-4 designates a male screw for screwing and connecting a nut (not shown) of the supply pipe or the injection pipe.

Bonding means for bonding the caps 2 and 2S and the securing flange 5 with respect to the body portion 1, and bonding means for bonding the branch connector including the branch pipe 12 and the branch joint fitting 4 according to the present invention are preferably furnace brazed, such as by brazing with copper based brazing material or brazing with nickel based brazing material. A method including the steps of activating the inner and the outer surfaces of the body portion 1 and the surface of the branch connector including the through hole 1-2 and the branch pipe 3 or the branch joint fitting 4 by a pre-finishing process with high degree of accuracy and, preferably, plate-coating with material such as nickel or copper, and maintaining the same for a sufficient time period at a diffusing temperature for diffusion bonding may also be applicable.

Though it is not shown in the drawings, the caps 2 and 2S may be provided with a branch tube or the branch joint fitting.

As described thus far, according to the common rail of the present invention, since the entire common rail is constructed of the separate members, and is formed by bonding these members into a single unit instead of molding integrally by die forging, a high strength and high price mold are not necessary at all, and time required for machining such as cutting work can be significantly reduced. In addition, since less expensive parts such as a precut thick steel material or a pressed product formed of a steel plate may be used as components, it is not necessary to heat the material to a high temperature as in the related art. Therefore, energy required for heating is not necessary and hence post processing such as shot blast or acid cleaning for removing oxide scale is not required, whereby manufacturing costs may be advantageously reduced.

What is claimed is:

1. A common rail comprising:
    a short metal tubular body having opposite first and second ends and a thick tubular wall extending between the ends, the tubular wall having opposite inner and outer circumferential surfaces, a plurality of through holes formed through the tubular body from the inner circumferential surface to the outer circumferential surface at locations between the opposite first and second ends of the tubular body;
    first and second metal caps fit and bonded in the tubular body in proximity to the respective first and second ends, the first and second ends of the tubular body being caulked inwardly for engaging portions of the respective first and second caps;
    a securing flange mounted around and bonded to the outer circumferential surface of the tubular body in proximity to the first end thereof; and
    a plurality of metal branch connectors fitted and bonded to the tubular side wall at the respective through holes therein.

2. A common rail accordingly to claim 1, wherein the tubular body is formed of a carbon steel pipe for pressure piping or a stainless steel pipe.

3. A common rail according to claim 1, wherein the tubular body has a thickness of 3 to 15 mm.

4. A common rail accordingly to claim 1, wherein the second end of the tubular body is squeezed to define a diameter smaller than a diameter existing at the first end of the tubular body.

5. A common rail according to claim 1, wherein the securing flange is substantially planar and projects out from the tubular body.

* * * * *